3,707,528
RECOVERY OF POLY(ARYLENE SULFIDE)
REACTION SLURRY CONSTITUENTS
John M. Miles, Bartlesville, Okla., assignor to
Phillips Petroleum Company
Filed Jan. 12, 1971, Ser. No. 105,902
Int. Cl. C08g 23/00
U.S. Cl. 260—79
6 Claims

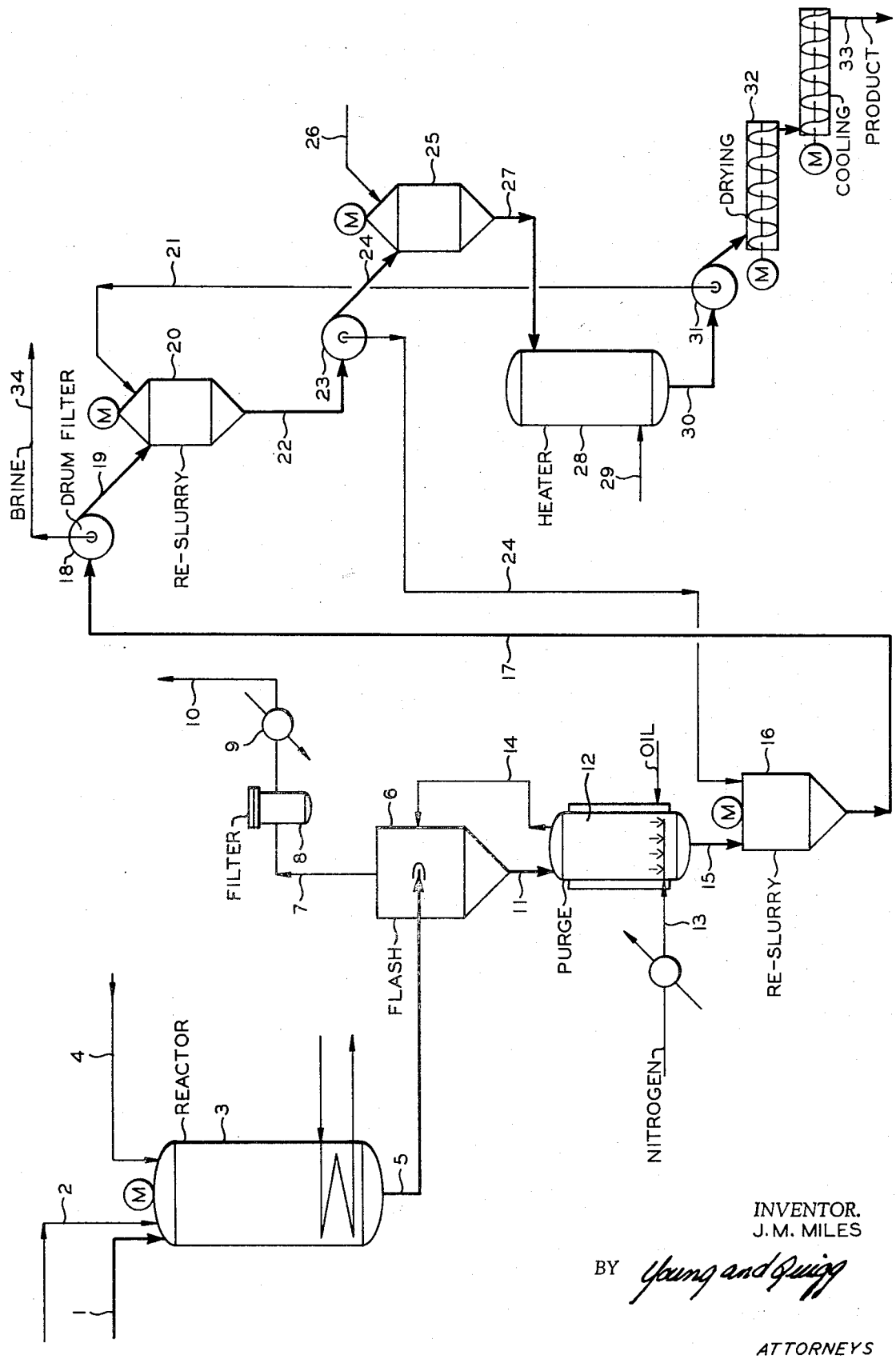

ABSTRACT OF THE DISCLOSURE

An economically improved method for recovery of poly(arylene sulfide) substantially free of impurities and organic polar diluent from a reaction slurry of poly(arylene sulfide) solid polymer particles, organic polar diluent, by-product alkali metal halide, and other impurities is provided by the atmospheric adiabatic evaporation of organic polar diluent from a reaction slurry of high sensible heat content prior to processing poly(arylene sulfide) solid polymer particles to remove other impurities.

BACKGROUND OF THE INVENTION

This invention relates to recovery of the constituents of poly(arylene sulfide) reaction slurries. In accordance with one aspect of the invention it relates to the recovery of polar organic diluent from a poly(arylene sulfide) reaction slurry. In another aspect of the invention it relates to recovery of poly(arylene sulfide) from its reaction slurry. In still another aspect of the invention it relates to atmospheric adiabatic evaporation of diluents from reaction slurries.

In one of its concepts the invention relates to adiabatic atmospheric evaporation of polar organic diluent from a reaction slurry by producing a slurry of increased sensible heat content at a given pressure followed by a sharp reduction in pressure. In another of its concepts the invention relates to separation of a poly(arylene sulfide) compound from its reaction slurry by evaporation of the diluent from the mixture prior to filtering in order to obtain a more readily processable particulate polymer. In another of its concepts, the invention relates to the removal of alkali metal halides and other contaminants from a reaction slurry residue from which the polar diluent has been evaporated by washing the residue with water and/or hydrocarbon reslurrying agent and then removing the reslurrying agent to recover the purified polymer.

A poly(arylene sulfide) must be relatively free of metal halide salts and other ash producing contaminants to be of full usefulness and value. A major problem in the production of poly(arylene sulfide) has been the recovery of high purity polymer from the contaminants in its reaction slurry. It was discovered early in the commercial production of poly(arylene sulfide) that the polar diluents usually used in polymerization processes caused difficulty in separating the polymer from its slurry by such usual means as filtration in that the diluent and polymer produce a filter cake of such "pasty" physical characteristics that plugging of the filter is a continuous problem and washing the filter cake free of other contaminants is impossible. To avoid these problems, methods have been proposed for removal of the diluent from the polymer before separation of the polymer and other contaminants is attempted. Methods of vacuum evaporation of the diluent have proved successful in separating the diluent and polymer to produce a slurry filter cake that can be reslurried and filtered to remove metal halide salts and other contaminants. Until recently, however, supposed restrictions on the range of reaction temperature used to produce poly(arylene sulfide) has obscured the possibility of improving the recovery process. It has now been found that the reaction temperature for the arylene sulfide polymerization reaction can be run in higher temperature ranges without deleteriously affecting the properties of the polymer produced so that the economics of process installation and operation can be greatly improved. Producing the polymer slurry at higher temperatures increases the sensible heat of the slurry sufficiently to allow an atmospheric adiabatic flash evaporation to remove a substantial portion of the polar organic diluent. This process results in savings in investment in processing equipment and in manufacturing cost per pound of polymer produced.

Accordingly, it is an object of this invention to provide a more economical method for recovering poly(arylene sulfide) from reaction systems in which it is produced. Another object of this invention is to provide a mechanically simpler, more economical, efficient method for recovering polar organic solvent from an arylene sulfide polymerization reaction process. Another object of this invention is to provide an integrated method for recovery of poly(arylene sulfide) from its reaction slurry which also removes metal halide salts and other impurities from the poly(arylene sulfide) product.

Other aspects, objects and advantages of this invention will be apparent to one skilled in the art upon studying the specification, drawing and the appended claims.

SUMMARY OF THE INVENTION

In accordance with the invention arylene sulfide polymerization reaction slurries of high sensible heat content containing poly(arylene sulfides), organic polar diluents, alkali metal halides and other impurities are subjected to atmospheric adiabatic evaporation to remove polar organic diluents and then are subjected to washing and removal of the wash solution to obtain substantially impurity-free polymer.

In accordance with one embodiment of the invention the polar organic diluent is recovered from arylene sulfide polymerization reaction slurries containing poly(arylene sulfide), polar organic diluent, alkali metal halide, and other impurities, by the method of conducting the reaction which produces the slurry at a pressure and at a temperature elevated sufficiently to yield a slurry of sensible heat content such that reducing the pressure on the slurry to atmospheric pressure will cause a substantially complete flashing of the polar organic diluent from the slurry, then reducing pressure on the slurry to atmospheric to produce a flashed slurry and recovering the flashed polar organic diluent.

In another embodiment of the invention the flashed slurry obtained in the process above is subjected to agitation while being contacted with a heated gaseous medium which gaseous medium removes traces of polar organic diluent to produce a diluent-free treated slurry residue and the traces of polar organic diluent removed from the flashed slurry are recovered from the gaseous medium.

In another embodiment of the invention the treated slurry residue obtained above is reslurried with a liquid diluent in which alkali metal halides and other impurities are soluble and the liquid diluent containing dissolved impurities is removed leaving a solid particulate poly(arylene sulfide) in a process which can be repeated until the desired level of poly(arylene sulfide) purity is attained.

It is well known that the removal of the organic polar diluent from the poly(arylene sulfide) slurries prior to washing and removal of the wash solution results in the recovery of highly processable polymer particles with a high degree of purity. The removal of polar organic diluent from the slurry can be effected by atmospheric adiabatic evaporation in the polymer reactor itself as in the case of the batch reaction, or in a separate evaporation zone as in the case of either a batch reaction or a continuous reaction. It is presently preferred to carry out the reaction producing a slurry of high sensible heat content in a continuous reaction effecting the evaporation by subjecting the slurry to an atmospheric adiabatic expansion in an evaporation zone separate from the reactor.

The process of this invention is useful with poly(arylene sulfides) generally, regardless of the method of preparation. However, the invention is especially useful with polymers prepared with the solution reaction of polyhalo compounds with metal sulfide as described in U.S. Pat. No. 3,354,129.

According to said patent poly(arylene sulfide) polymers can be prepared at high yield by reacting at least one polyhalo-substituted cyclic compound containing unsaturation between adjacent ring atoms and wherein the halogen atoms are attached to ring carbon atoms with an alkali metal sulfide in a polar organic diluent at an elevated temperature. Generally, the polar organic diluent will substantially dissolve both of the alkali metal sulfide and the polyhalo-substituted aromatic compound or other compound which can be present. The polymers produced by the process of said patent are ordinarily particulate materials and the properties of these materials will vary considerably depending upon the chosen reactants. Some are high melting thermoplastic materials having excellent high temperature stability, while others can be much lower in molecular weight, including liquids and grease-like materials. Melting point or softening point of these polymers can range all the way from liquids at 25° C. to polymers melting above 400° C.

The polyhalo-substituted compounds which can be employed as primary reactants according to said patent are represented by the formulas:

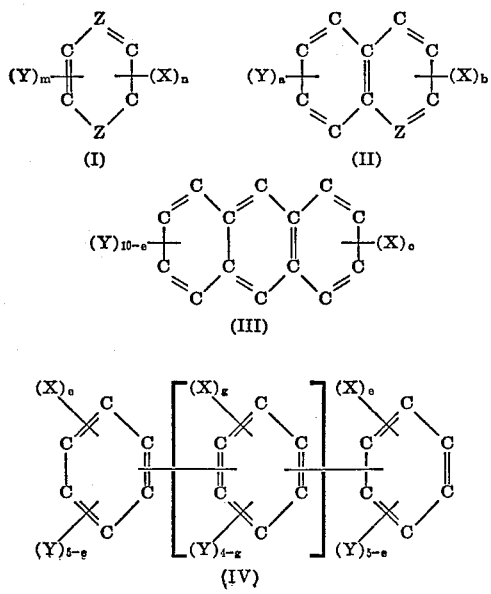

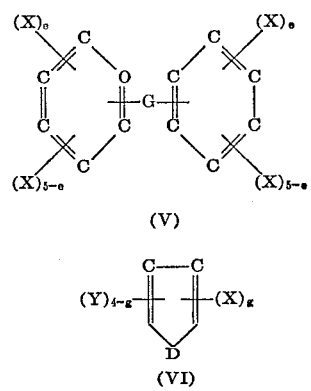

(VI)

wherein each X is a halogen selected from the group consisting of chlorine, bromine, iodine, and fluorine, preferably chlorine and bromine, each Y is selected from the group consisting of hydrogen, —R, —N(R)$_2$,

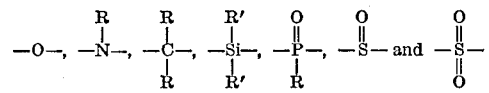

—O—R′, —S—R′, —SO$_3$H, and —SO$_3$M, wherein each —R is selected from the group consisting of hydrogen and alkyl, cycloalkyl, aryl, aralkyl, and alkaryl radicals containing from 1 to 12 carbon atoms, inclusive; each R′ is selected from the group consisting of alkyl, cycloalkyl, aryl, aralkyl and alkaryl radicals containing from 1 to 12 carbon atoms inclusive; each Z is selected from the group consisting of —N=; and —C=; D is selected from the group consisting of —O—, —S—, and $$-\underset{\underset{R}{|}}{N}-$$

G is selected from the group consisting of $$-O-,\ -\underset{\underset{R}{|}}{N}-,\ -\underset{\underset{R'}{|}}{\overset{\overset{R}{|}}{C}}-,\ -\underset{\underset{R}{|}}{\overset{\overset{R'}{|}}{Si}}-,\ -\underset{\underset{R}{|}}{\overset{\overset{O}{\|}}{P}}-,\ -\overset{\overset{O}{\|}}{S}-\text{ and }-\underset{\underset{O}{\|}}{\overset{\overset{O}{\|}}{S}}-$$

M is an alkali metal selected from the group consisting of sodium, potassium, lithium, rubidium, and cesium; $n$ is a whole integer of from 2 to 6, inclusive; when both Z's in Formula I are —C=, $m=6-n$, when one Z in Formula I is —C=, $m=5-n$, when both Z's in Formula I are —N=, $m=4-n$; $b$ is a whole integer of from 2 to 8, inclusive; when Z in Formula II is —C=, $a=8-b$, when Z in Formula II is —N=, $a=7-b$; $c$ is a whole integer of from 2 to 10, inclusive; $e$ is a whole integer of from 1 to 5, inclusive, $g$ is a whole integer of from 2 to 4, inclusive, and $p$ is a whole integer selected from the group consisting of 0 and 1.

The compounds of the above general formulas which are preferred are those which contain not more than three halogen atoms, and more preferably are dihalo-substituted compounds.

The alkali metal sulfides which can be employed in the process of said patent are represented by the formula M$_2$S wherein M is as defined above, and includes the monosulfides of sodium, potassium, lithium, rubidium and cesium, including the anhydrous and hydrated forms of these sulfides. The preferred sulfide reactant is Na$_2$S and its hydrates. This sulfide can be purchased having 9 mols of water of hydration per mol of Na$_2$S, or it can be obtained containing about 60–62 weight percent Na$_2$S and about 38–40 weight percent water of hydration.

The polar organic compounds which are employed as reaction media in the process of said patent should be solvents for the polyhaloaromatic compounds and the alkali metal sulfides. Representative examples of suitable classes of compounds include amides, lactams, sulfones, and the like. Specific examples of such compounds are hexamethylphosphoramide, tetramethylurea, N,N′-ethylene dipyrrolidone, N-methyl-2-pyrrolidone (NMP), pyrrolidone, caprolactam, N-ethylcaprolactam, sulfolane, dimethylacetamide, low molecular weight polyamides, and the like.

Some specific examples of polyhalo-substituted compounds of the above general formulas which can be employed in the process of said patent are:

1,2-dichlorobene
1,3-dichlorobenzene
1,4-dichlorobenzene
2,5-dichlorotoluene
1,4-dibromobenzene
1,4-diiododbenzene
1,4-difluorobenzene
2,5-dibromoaniline
N,N-dimethyl-2,5-dibromoaniline
1,3,5-trichlorobenzene
1,2,4-trichlorobenzene
1,2,4,5-tetrabromobenzene
hexachlorobenzene
1-n-butyl-2,5-dichlorobenzene, and the like.

As indicated above, in accordance with this invention a method for separating arylene sulfide polymers from slurries thereof with polar organic diluents and alkali metal halide and other impurities is provided, which method comprises subjecting a high sensible heat content reaction slurry to atmospheric adiabatic evaporation to remove essentially all of the polar organic diluent and then reslurrying the remaining polymer and impurities and washing with water and/or hydrocarbon and then centrifuging or filtering with additional washing if necessary for recovery of purified polymer. If the evaporation step is carried out in a separate vessel, the polar organic diluent is flashed overhead from the evaporator and after condensation can be returned to the polymerization reactor for reuse as desired. The polymer particles containing alkali metal halide and other impurities can be removed from the evaporation vessel by adding thereto water or other aqueous medium and/or a hydrocarbon to form a slurry which slurry can thus be passed to the filtering system.

The conditions employed in the evaporation zone can vary but the pressure in this zone will always be at or above atmospheric pressure. The temperature of the polymer slurry from the reactor will ordinarily range from about 500° to about 850° F. and more preferably will be within the range of 550° to 625° F. Naturally, higher sensible heat content is produced with more elevated temperature so that even more polar organic diluent is removed by adiabatic atmospheric flashing of slurry produced in a temperature range of 575° to 625° F. The temperature in the flash zone after pressure reduction will be about 400° F. The pressure in the reaction zone will be in the range of about 200 to about 400 p.s.i.a. The major portion of the polar diluent is removed in the flash zone.

To remove the remaining polar organic diluent from the flashed slurry, this material is intimately contacted with a heated gaseous medium, such as nitrogen, methane, or other common purge gas, which is inert to reaction with the flashed slurry material. The heated gaseous medium volatilizes the remaining polar organic diluent and carries it away to a recovery section where the diluent is condensed to be returned to the reaction system. Contact of the gaseous medium heated above the vaporization temperature of the polar diluent and the flashed slurry is most effectively conducted with agitation of the flashed slurry. Although the hot gas contact chamber can be arranged so that the purge gas itself provides agitation for the flashed slurry, at present a contact chamber containing mechanical means for agitation is preferred in this process.

As has been indicated above, water and/or hydrocarbon can be used for reslurrying polymer particles following removal of the polar diluent. The amount of water, other aqueous medium and/or hydrocarbon added to the polymer particles will be sufficient to form a slurry that can be transferred from the reslurrying area to the zone where the reslurrying liquid is removed. Slurries having a solids content of 5 to 40 weight percent are usually employed.

A hydrocarbon miscible with a polar organic diluent is preferred if such agent is used in reslurrying the polymer particles. Representative examples of such hydrocarbons include toluene, benzene, xylenes, and ethylbenzene. The hydrocarbon thus could be used to dissolve any residual diluent during the reslurrying step. At present water is the preferred reslurrying or wash liquid.

The slurry of polymer particles in water and/or hydrocarbon is passed to a zone wherein the solid polymer is separated from the water and/or hydrocarbon. Any scant amount of residual polar organic diluent is thus removed from the polymer with the water and/or hydrocarbon together with at least some of the alkali metal halide and other impurities.

After removal of the reslurrying liquid phase by such means as filtration or centrifugation, the polymer is generally washed with water for removal of residual alkali metal halide. The washing with water may be accomplished on the filter or in the centrifuge or the solid polymer particles may be discharged into a tank wherein they are reslurried with water and the refiltered or recentrifuged. Any conventional filter or centrifuge may be employed using conventional operating procedures. Following removal of the last wash solution any conventional drying operation may be employed to remove the last vestiges of the wash liquid from the polymer particles.

The operation of this invention can be best understood by reference to the drawing which shows a method for producing poly(arylene sulfide) reaction slurry of high specific heat content with subsequent removal of the polar organic diluent by direct atmospheric adiabatic flashing and recovery of poly(arylene sulfide) from which impurities have been removed. In the drawing the alkali metal sulfide and water are pumped through line 1 and polyhalo-substituted compounds are pumped through line 2 into the reactor 3 to be reacted at conditions of elevated temperature in the range of 500° to 850° F. and elevated pressure in the range of 200 to 400 p.s.i.a. to produce along with the polar diluent introduced through line 4, a reaction slurry of such high specific heat content that upon being discharged through line 5 into an atmospheric expansion chamber 6 adiabatic expansion will vaporize the majority of the polar organic diluent leaving a flashed slurry at about 400° F. The flashed polar diluent is removed through line 7 and filter 8 which removes entrained fine solid materials to be condensed in a heat exchanger 9 and carried through line 10 to a purification system, which is not shown, from which it can be returned to the reactor. The flashed slurry is conveyed through line 11 into a chamber 12 where it is contacted with agitation with a heated, inert purge gas which is introduced through line 13. This chamber is equipped with a means of heat input to maintain the temperature above the vaporization temperature of the polar diluent which is removed as a vapor by the purge gas through line 14 to the atmospheric flash chamber 6. The flashed slurry from which the polar diluent has now been removed is carried through line 15 into a slurry tank 16 into which water is introduced through line 24. The slurry of water and reaction product contaminated polymer is removed through line 17 to a filter or centrifuge 18 wherein the wash water containing dissolved salt and other impurities is removed via line 34. Partially purified filter cake is passed via line 19 into reslurry tank 20 into which additional water is passed via pipe 21. The polymer and water are stirred in tank 20 and additional salt dissolved from the polymer by the water. The resulting polymer slurry is passed via line 22 to filter 23 which removes water wash that is advantageously recycled via pipe 24 to tank 16. Polymer thus additionally purified by two stages of water contacting and filtration is passed via pipe 27 to tank 28 wherein it is reslurried with hot water and steam, thus removing final traces of salt with hot water. The hot polymer slurry is then passed via pipe 30 to filter 31 wherein water containing only a small amount of salt is removed and passed via pipe 21 to reslurry tank 20. Thus it is seen that the polymer cake is purified of salt by contacting with pure water in the next-to-last stage of treatment (tank 25), purified with hot, pure water in the last stage (tank 28) and purified with recycle water containing a little salt in the first two stages, tanks 16 and 20. The hot, purified polymer from filter 31 is passed to drying and cooling steps 32 and 33 for removal of water and temperature reduction.

The following examples illustrating the process of this invention are meant to be illustrative and not exclusive.

Example I

By the method of this invention a slurry comprising 18 parts polyphenylene sulfide, 16.5 parts NaCl and 65.5 parts N-methyl-pyrrolidone (NMP), formed by reacting p-dichlorobenzene with sodium sulfide in NMP diluent at temperatures ranging from 475° F. to 600° F. for two to three hours to obtain nearly complete conversion was discharged to an adiabatic atmospheric flash cyclone whereby substantial amounts of the N-methyl-pyrrolidone was flashed overhead as detailed in the tabulation below. The flash bottoms were accumulated in a ribbon blender-surge tank which was maintained at a temperature above the vaporization temperature of N-methyl-pyrrolidone by jacketing the surge tank with hot oil and purging the surge tank with hot nitrogen. The flash bottoms were fed continuously from the surge tank through a rotary valve into an agitated conveyor such as a Porcupine processor heated with hot oil and purged with nitrogen where essentially complete N-methyl-pyrrolidone removal was accomplished. Vapors from the N-methyl-pyrrolidone removal equipment were fed to a bag filter for removal of fines carry over and then condensed for an operation of purifying the N-methyl-pyrrolidone.

SUMMARY OF FLASHING TEST DATA

| Test No. | Slurry temperature, °F. | Cyclone temperature, °F. | Percent of NMP removed by flashing |
|---|---|---|---|
| 1 | 600 | 350 | 67.9 |
| 2 | 600 | 400 | 77.9 |
| 3 | 600 | 400 | 78.4 |
| 4 | 600 | 400 | 82.1 |
| 5 | 550 | 400 | 73.9 |
| 6 | 550 | 350 | 73.8 |
| 7 | 550 | 400 | 69.6 |
| 8 | 550 | 400 | 80.4 |
| 9 | 500 | 400 | 67.3 |
| 10 | 475 | 400 | 61.2 |

Thus it is seen that approximately 80 percent of the NMP contained in the polymer slurry from the polymerization reactor can be removed by flashing the hot slurry into a cyclone operated at atmospheric pressure. Having thus removed about 80 percent of the diluent by flashing, the remaining 20 percent is easily removed by processing through conventional drying equipment such as purged conveyors. When less than about 75 percent of thhe NMP is removed, there will be some free liquid NMP in the polymer discharged from the cyclone which free liquid will cause sticky polymer to foul the subsequent drying equipment. When 75 percent or more of the NMP is removed by flashing, however, there is no free NMP liquid present in the polymer discharged from the cyclone and no fouling problems are encountered with the drying equipment.

Example II

By a method not of this invention a slurry comprising 18 parts polyphenylene sulfide, 16.5 parts NaCl and 65.5 parts N-methyl-pyrrolidone, formed by reacting p-dichlorobenzene with sodium sulfide in N-methyl-2-pyrrolidone diluent at 485° F. for three hours, was subjected to vacuum flashing and filtering according to the conventional process. The reaction slurry, at a temperature of 485° F., was flashed to a pressure of 5 millimeters Hg and a temperature of 350° F. whereby approximately 99 percent of the N-methyl-pyrrolidone was removed from the slurry. While a high percentage of the NMP was thus removed, operation of the flashing step under high vacuum conditions is undesirable because of the difficulties in transporting solids into and out of vacuum vessels and because air leakage into the vacuum vessel causes degradation of the polymer.

Example III

By the process of this invention the Porcupine processor discharges the flash bottoms from which N-methyl-pyrrolidone has been removed, directly into a slurry vessel where water and steam are added to dissolve the salt at a temperature of about 180° F. and about 1 atmosphere pressure. The resulting slurry is filtered in a rotary, vacuum filter the solid discharge from which is again reslurried with water and steam at a temperature of about 350° F. and 1 atmosphere pressure. The resulting slurry is filtered in a rotary, vacuum filter. The filter cake from this filtration is subjected to a final wash at 350° F. and 135 p.s.i.a. The resulting slurry is again filtered in a rotary, vacuum filter which produces a filter cake of polyphenylene sulfide polymer having an ash level of 1 percent or less.

Reasonable variation and modification are possible within the scope of the foregoing disclosure, the drawing and appended claims to the invention the essence of which is that there has been provided an economically improved method for producing essentially ash-free poly(arylene sulfide) from its reaction slurry by increasing the reaction temperature to the extent necessary to produce a reaction slurry of sensible heat content sufficient to permit adiabatic atmospheric flashing of organic polar diluent from the reaction slurry and thus provide an easily processable solids material composed of poly(arylene sulfide) solid polymer particles and reaction impurities.

We claim:

1. A process for recovering polar organic diluent from reaction slurries comprising poly(arylene sulfide), polar organic diluent, alkali metal halide, and other impurities, which method comprises (a) conducting the reaction which produces the slurry at a pressure above atmospheric and at a temperature which is elevated sufficiently at reaction pressure to yield a slurry of sensible heat content such that reducing the pressure on the slurry to atmospheric pressure will cause flashing of at least 75 percent of the polar organic diluent from the slurry, (b) reducing the pressure on the slurry to atmospheric pressure to produce adiabatically a slurry residue from which at least 75 percent of the polar organic diluent has been flashed, and (c) recovering the flashed polar organic diluent.

2. The method of claim 1 wherein the flashed slurry residue is further treated to remove residual polar organic diluent by (a) subjecting the flashed slurry residue to agitation and contact with an inert gaseous medium heated to a temperature above the vaporization point of the polar organic diluent and (b) recovering from the gaseous medium the polar organic diluent removed from the flashed slurry residue.

3. A process for recovering poly(arylene sulfide) from reaction slurries comprising poly(arylene sulfide), polar organic diluent, alkali metal halide, and other impurities, which method comprises further treating the treated slurry residue of claim 2 by (a) slurrying the treated slurry residue in water which is of sufficiently elevated temperature to dissolve alkali metal halides and other impurities, (b) filtering the slurry to produce a filter cake of solid particulate material, (c) repeating steps (a) and (b) alternately to produce a filter cake containing 1 percent or less ash and (d) removing all traces of wash water from the solid particulate material.

4. The method of claim 1 wherein the reaction temperature is in the range of about 500° to about 850° F. and the reaction pressure is in the range of about 200 to about 400 p.s.i.a.

5. The method of claim 4 wherein the reaction temperature is in the range of 550° to 625° F.

6. A process of claim 1 in which the polar organic diluent is N-methyl-pyrrolidone and the alkali metal halide is sodium chloride.

References Cited
UNITED STATES PATENTS

| | | | |
|---|---|---|---|
| 3,407,182 | 10/1968 | Hinton | 260—79 |
| 3,478,000 | 11/1969 | Saunders et al. | 260—79.1 |

DONALD E. CZAJA, Primary Examiner

M. I. MARQUIS, Assistant Examiner

U.S. Cl. X.R.

203—88; 260—79.1